United States Patent
Togashi et al.

(10) Patent No.: US 9,400,623 B2
(45) Date of Patent: Jul. 26, 2016

(54) PRINT SERVER FOR ACQUIRING PRINT JOB BY EMAIL, PRINTING SYSTEM, AND PRINTING METHOD

(71) Applicant: SEIKO EPSON CORPORATION, Tokyo (JP)

(72) Inventors: Koki Togashi, Nagano (JP); Junpei Uchida, Nagano (JP); Masayuki Kobayashi, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/792,911

(22) Filed: Jul. 7, 2015

(65) Prior Publication Data

US 2016/0054958 A1 Feb. 25, 2016

(30) Foreign Application Priority Data

Aug. 22, 2014 (JP) ................. 2014-169133

(51) Int. Cl.
*G06F 3/12* (2006.01)
*H04N 1/00* (2006.01)
*G06K 15/00* (2006.01)

(52) U.S. Cl.
CPC ............ *G06F 3/1206* (2013.01); *G06F 3/1269* (2013.01); *G06F 3/1287* (2013.01); *G06F 3/1288* (2013.01); *H04N 1/00209* (2013.01)

(58) Field of Classification Search
CPC .................................................. G06F 3/1206
See application file for complete search history.

(56) References Cited

U.S. PATENT DOCUMENTS

| 5,638,511 A | 6/1997 | Nezu | |
|---|---|---|---|
| 2003/0007172 A1 | 1/2003 | Takayanagi | |
| 2003/0063309 A1* | 4/2003 | Parry | G06K 15/005 358/1.15 |
| 2004/0130744 A1* | 7/2004 | Wu | H04N 1/00278 358/1.15 |
| 2004/0186925 A1* | 9/2004 | Cooper | G06F 9/4868 710/8 |
| 2008/0037062 A1* | 2/2008 | Omino | G06F 21/305 358/1.15 |
| 2010/0309505 A1* | 12/2010 | Partridge | G06F 21/608 358/1.15 |
| 2011/0222104 A1* | 9/2011 | Mohammad | G06F 3/1206 358/1.15 |

FOREIGN PATENT DOCUMENTS

| JP | 07-098691 A | 4/1995 |
|---|---|---|
| JP | 2002-361984 A | 12/2002 |

* cited by examiner

*Primary Examiner* — Dov Popovici
(74) *Attorney, Agent, or Firm* — Global IP Counselors, LLP

(57) ABSTRACT

A print server includes a job acquisition unit that acquires a print job, a job holding unit that holds the acquired print job, a transmission unit that transmits an email containing a URL for instructing execution of the held print job to an address corresponding to the print job, and an execution control unit that, in response to an access of the URL, communicates with a printing apparatus and causes the printing apparatus to execute printing that is based on the held print job.

7 Claims, 2 Drawing Sheets

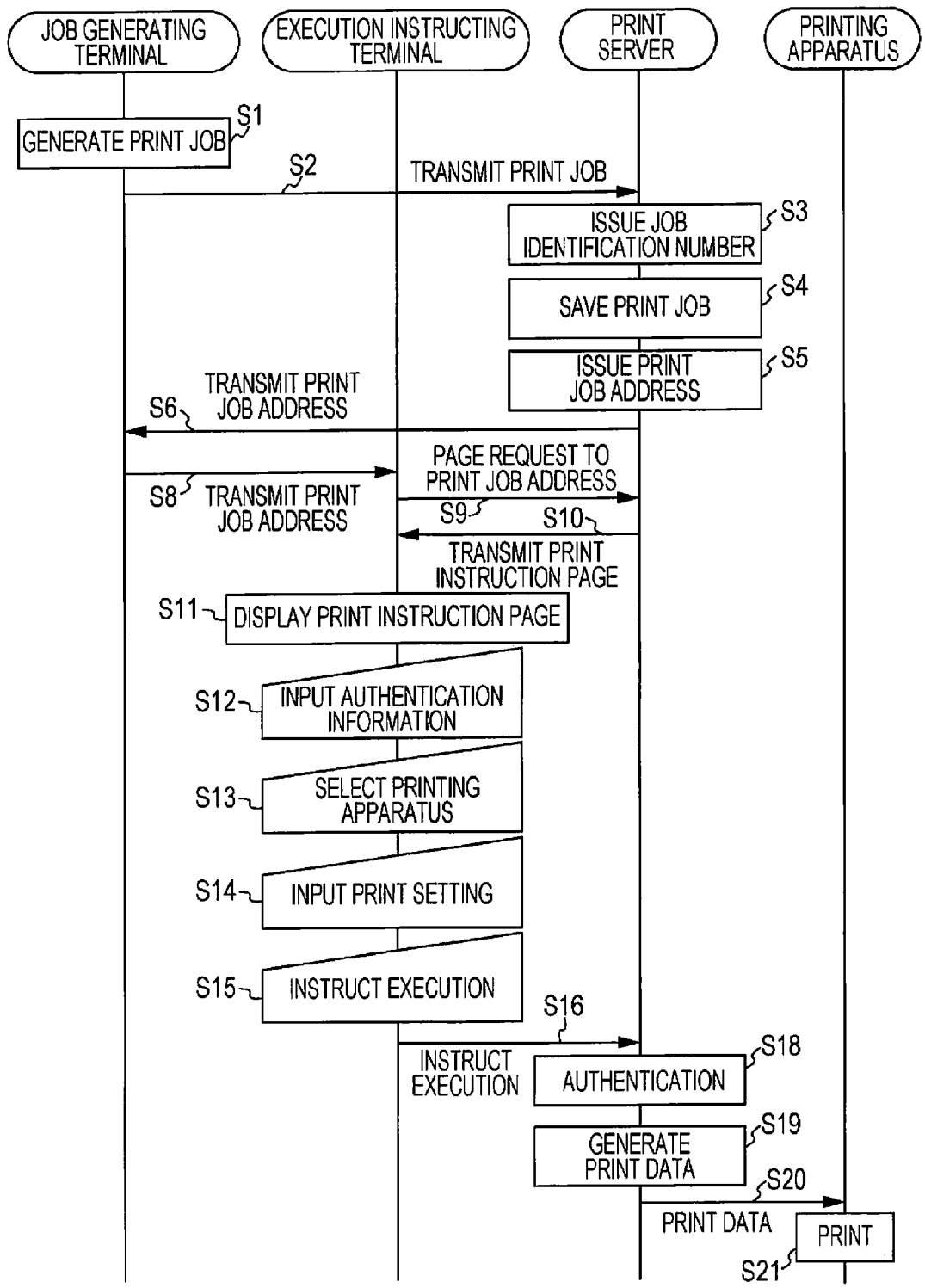

PRINT SERVER FOR ACQUIRING PRINT JOB BY EMAIL, PRINTING SYSTEM, AND PRINTING METHOD

BACKGROUND

1. Technical Field

The present invention relates to a print server, a printing system, and a printing method.

2. Related Art

In recent years, print servers that are connected to the Internet and allow a printing apparatus to execute a print job through using email have been utilized.

Further, as a printing system of the related art, there has been known a printing system that holds a print job at a print server and issues a verification key to a client and, in response to the verification key being inputted to the print server from a recording medium storing the verification key or by a user operation, executes printing for the job held at the print server (see, for example, JP-A-7-98691).

JP-A-2002-361984 is another example of the related art.

In the above-described printing system, however, there has been a problem that, since a verification key is required to be inputted to the print server from the storage medium or by user operation, the user has to perform an increased number of steps of operation for printing, which results in poor usability.

SUMMARY

A print server according to an aspect of the invention includes a job acquisition unit that acquires a print job, a job holding unit that holds the acquired print job, a transmission unit that transmits an email containing a URL for instructing execution of the held print job, and an execution control unit that, in response to an access of the URL, causes a printing apparatus to execute printing that is based on the print job corresponding to the URL.

According to the aspect, the access to the URL contained in the email results in printing of the held print job, so that the user is able to easily give a print instruction for the job and therefore good usability is achieved.

Further, the URL for instructing the execution of the print job is transmitted by email, so that the relationship between the print job and the user that receives the access information for the print job is not fixed by the email address. For example, according to the aspect, the user that has caused the print server to acquire the print job is able to cause another user to instruct the execution of the print job by forwarding, via email, the URL received by email. Further, according to the aspect, for example, after an email application (MUA: mail user agent) installed in a communication terminal receives the URL by email from the print server, even when the email cannot be transmitted by the email application, the user is able to instruct the execution of printing as long as the user can use the browser.

In the print server, the job acquisition unit may have a representative address for receiving an email from a communication terminal. The execution control unit may associate the representative address with a plurality of printing apparatuses and store information on the plurality of printing apparatus. In the URL or a second URL linked directly or indirectly to the URL, the execution control unit may accept selection of any of the plurality of printing apparatuses associated with the representative address and cause the selected printing apparatus to execute printing that is based on the held print job.

This configuration allows the printing apparatus which executes printing to be selected at the timing of instructing the execution of printing. Further, a graphical user interface (GUI) for selecting the printing apparatus can be provided on a webpage, which facilitates the user's selection of the printing apparatus. Further, the representative mail address corresponds to a virtual printing apparatus for the user. The user is able to obtain the printed material at a desired time and a desired place by using such virtual printing apparatus.

The execution control unit may accept an input of a print setting on a webpage corresponding to the URL or a second URL linked directly or indirectly to the URL and cause the printing apparatus to execute printing based on the inputted print setting.

This configuration allows the user to input the print setting at the timing of instructing the execution of printing. Further, the GUI for inputting the print setting can be provided on the webpage, which facilitates the user's input of the print setting.

BRIEF DESCRIPTION OF THE DRAWINGS

The invention will be described with reference to the accompanying drawings, wherein like numbers reference like elements.

FIG. 3 is a sequence chart illustrating one embodiment of the invention.

DESCRIPTION OF EXEMPLARY EMBODIMENTS

Embodiments of the invention will be described below with reference to the drawings. Note that, in the respective drawings, like numbers reference corresponding elements and duplicated description thereof is omitted.

1. General Configuration

Figure 1:
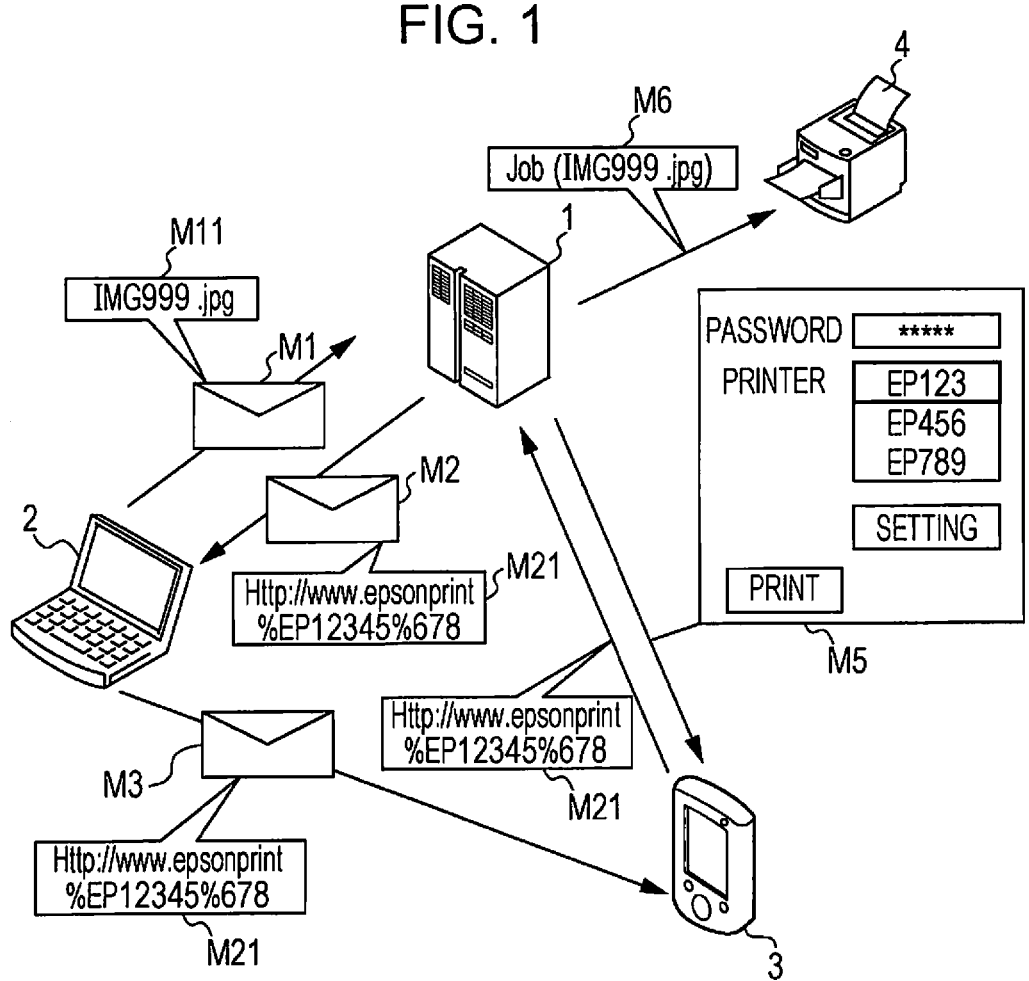
FIG. 1 is a system configuration diagram illustrating one embodiment of the invention.

FIG. 1 illustrates the configuration of a printing system according to one embodiment of the invention. The printing system of the present embodiment includes a print server 1 connected to the Internet and a printing apparatus 4. The print server 1 communicates with a job generating terminal 2 and an execution instructing terminal 3 that include a personal computer (PC) and/or a smartphone connected to the Internet, and causes the printing apparatus 4 to execute printing that is based on a print job generated by the job generating terminal 2. The print server 1 communicates with the job generating terminal 2 by the Simple Message Transfer Protocol (SMTP), communicates with the execution instructing terminal 3 by the Hyper Text Transfer Protocol (HTTP), and communicates with the printing apparatus 4 by the HTTP and the Extensible Messaging and Presence Protocol (XMPP).

In response to an email M1 containing a print object M11 being transmitted from the job generating terminal 2 to the print server 1, the print server 1 saves a print job for printing the print object M11. Upon receiving the email M1, the print server 1 transmits back to the job generating terminal 2 an email M2 containing a print job address M21 that is a URL for accessing the corresponding print job. The job generating terminal 2 transmits an email M3 containing the print job address M21 to the execution instructing terminal 3 that is a terminal which instructs execution of printing of the print object M11. This allows the execution instructing terminal 3, which is different from the job generating terminal 2, to instruct print execution. The execution instructing terminal 3 starts up a browser to access the print job address M21, acquires a print instruction page M5 from the print server 1, and displays it. The user of the execution instructing terminal 3 operates the print instruction page M5 to instruct the execution of printing. The print server 1 instructed to execute printing causes the printing apparatus 4 to execute printing that is based on the print job saved in association with the URL of the print instruction page M5. Note that the job generating terminal 2 and the execution instructing terminal 3 may be the same communication terminal and, in this case, the transmission and reception of the email M3 is unnecessary.

2. Configuration

Figure 2:
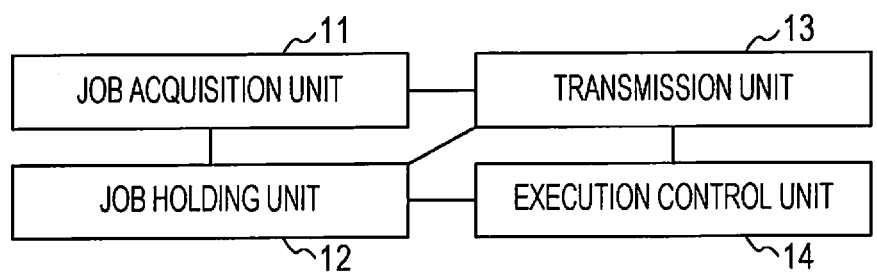
FIG. 2 is a block diagram illustrating one embodiment of the invention.

FIG. 2 is a block diagram illustrating a functional configuration of the print server 1. The print server 1 is a computer system that includes a processor, a main storage device, an input and output mechanism, an external storage device, and an Internet communication interface, which are not depicted. The print server 1 may be formed of one computer or a plurality of computers connected by communication lines. A control program is installed in the print server 1. When executing the control program at the processor, the print server 1 functions as a job acquisition unit 11, a job holding unit 12, a transmission unit 13, and an execution controlling unit 14.

In order to configure a printing system by the print server 1 and the printing apparatus 4, it is necessary to register the printing apparatus 4 at the print server 1 in advance. Specifically, in order that the print server 1 and the printing apparatus 4 communicate with each other, an address, an ID, a pass phrase, and so on of the printing apparatus 4 are registered at the print server 1 in advance. In addition, a plurality of printing apparatuses can be registered with the print server 1. That is, the printing system of the present embodiment may include a plurality of printing apparatuses as its components.

3. Operation

FIG. 3 is a sequence chart illustrating the operation of the printing system. The sequence illustrated in FIG. 3 is started in response to the job generating terminal 2 starting up an email application to create an email to which a file of the print object is attached or create an email whose text is a character string of the print object. The process in which the job generating terminal 2 generates the email to which the file of the print object is attached and/or the email in which the character string of the print object is written in the text corresponds to the print job generation (S1). As the destination of the email, a representative address at which the print server 1 receives the email is set. The representative address may be published in a state where anybody can know it or may be published to only a registered user of the print server 1. Alternatively, the job generating terminal 2 may be a communication terminal in which an application program having the representative address and linked with the print server 1 is installed.

In response to the email generated by the job generation terminal 2 being transmitted to the representative address (S2), the print server 1 receives this email and issues a job identification number to the print job (S3). The job identification number may be information by which the print job is uniquely identified. Here, after determining whether or not to keep the print job, the print server 1 issues the job identification number. Specifically, the job holding unit 12 analyzes the received email and, when a file is attached, determines whether or not the file is in a printable form. When the file is in the printable form, the print server 1 issues the job identification number to that file. Here, the printable form refers to a form in which the print server 1 is able to generate print data from the attached file. When one or more files in an unprintable form are attached, the print server 1 does not issue the job identification number. Further, the job holding unit 12 may issue the job identification number to the print job, only under the condition where a predetermined number is not exceeded by the number of print jobs that are from the same sender and have not been executed. Further, the print server 1 may save the subject of the email in association with the job identification number and write the print job to a later-described execution instruction page, as the information from which the user can easily identify the print job. Further, the print server 1 may transmit an error message back to the job generating terminal 2 by email when not issuing the job identification number.

Next, the print server 1 saves, as the print job, the received email or the content thereof that is the print object in association with the job identification number (S4). Specifically, when all the files attached to the received email are printable, the job holding unit 12 saves those files as the print job. When no file is attached to the email, the print server 1 saves the text of the email as the print job.

Next, the print server 1 issues, as the print job address, the URL of the print instruction page that is a webpage for accepting the instruction on execution of printing that is based on the saved print job (S5). Specifically, based on a character string that is the encrypted version of the job identification number, the transmission unit 13 issues the print job address that is the URL of the print instruction page in which an interface for accepting input of the authentication information, selection of the printing apparatus, input of the print setting, and instruction on execution of printing is provided. This print job address is a character string from which the job identification number can be acquired when decoded. In this way, the print job is associated with the print job address.

Next, the print server 1 transmits the print job address that is the URL of the print instruction page back to the job generating terminal 2 by email (S6). Specifically, the transmission unit 13 generates and transmits an email which contains the URL of the print instruction page in the text and whose destination is the sender address of the email received from the job generating terminal 2. Further, in this email, a hyperlink set to the print instruction page has been provided in the URL written in the text.

After receiving the print job address by email, the job generating terminal 2 transmits the print job address to the execution instructing terminal 3 by forwarding the email to the execution instructing terminal 3 in response to the user operation (S8). At this time, the user of the job generating terminal 2 may forward the email to a webmail address. When the email is forwarded to the webmail address, the print job address can also be received, using the web browser, by the execution instructing terminal 3 which is unable to utilize the email application.

After receiving the URL by email, the execution instructing terminal 3 starts up the browser in response to the user operation and requests the execution instruction page from the received URL (S9). Specifically, for example, the user opens the email by the email application installed in the execution instructing terminal 3 and taps or clicks the link to the URL to start up the browser, and the started-up browser transmits a page request to the received URL.

In response to the print server 1 receiving the page request, the execution control unit 14 of the print server 1 transmits the print instruction page to the execution instructing terminal 3 that has requested the page (S10).

In response to the execution instructing terminal 3 receiving the print instruction page, the browser of the execution instructing terminal 3 displays the print instruction page on a screen (S11). Specifically, the print instruction page in which the interface for accepting the input of the authentication information, the selection of the printing apparatus, the input of the print setting, and the instruction on execution of printing is provided is displayed on the screen by the browser.

Next, the user of the execution instructing terminal 3 operates the print instruction page to input the authentication information, select the printing apparatus, input the print setting, and instruct the execution of the print job (S12 to S14). Here, the execution control unit 14 may accept, on one page of the print instruction page, the operations of the input of the authentication information, the selection of the printing apparatus, the input of the print setting, and the instruction on execution of the print job, or may accept them through different print instructions that are directly or indirectly linked to a first print instruction page. That is, the print server 1 may transmit a plurality of print instruction pages to the execution instructing terminal 3 in response to the user operation of the execution instructing terminal 3. When the plurality of print instruction pages are transmitted to the execution instructing terminal 3, the execution control unit 14 embeds the URL of a second and subsequent print instructing pages into the respective previous pages, and transmits the subsequent pages in response to the user operation of the execution instructing terminal 3 applied to the browser. Note that, when the input of the authentication information, the selection of the printing apparatus, and the input of the print setting are accepted by the plurality of print execution pages, the input of the authentication information, the selection of the printing apparatus, and the input of the print setting may be accepted in any order.

The authentication information is information for confirming the right to instruct execution of the corresponding print job. Notification of the authentication information may be given in advance to the registered user of the print server 1. Alternatively, the registered user may register in advance the authentication information with the print server 1. Alternatively, when transmitting the URL of the print instruction page to the job generating terminal 2, the print server 1 may generate the authentication information in association with the print job and write the authentication information in the text of the email. With the authentication information being written in advance in the text of the email when the URL of the print instruction page is transmitted to the job generating terminal, the user of the execution instructing terminal 3 is able to input the authentication information as long as either the user of the execution instructing terminal 3 is the same as the user of the job instructing terminal 2 or is the user who receives the URL by email from the user of the job instructing terminal 2. Further, when notification of the authentication information has been given in advance to the registered user or users of the print server 1 and as long as the user of the execution instructing terminal 3 is the registered user of the print server 1, the user of the execution instructing terminal 3 is able to input the authentication information even when the user of the execution instructing terminal 3 is not the same as that of the job generating terminal 2. Further, in cases other than the above, since the authentication information cannot be inputted, unauthorized execution of the print job is prevented.

The printing apparatus to be selected by the user has been registered with the print server 1 in association with a representative mail address. For example, any of the printing apparatuses that have been registered by a registered user of the print server 1 may be selected as the printing apparatus, or a registered user of the print server 1 may cause the user of the execution instructing terminal 3 to input the identification information of the printing apparatus to select the printing apparatus. Identification information of the respective printing apparatuses may be pre-stored in the respective printing apparatuses and the execution instructing terminal 3 may acquire the identification information from the printing apparatus 4 by near field communication (NFC). Further, for example, a barcode or a two-dimensional matrix code of the identification information may be attached to the printing apparatus 4 in advance and a camera of the execution instructing terminal 3 may be caused to read the barcode. The identification information of the printing apparatus may include, for example, a unique mail address, a product serial number, or the like allocated to the printing apparatus. Further, other authentication information for utilizing the printing apparatus 4 may be inputted at the time of selection of the printing apparatus 4. That is, the authentication information for instructing the execution of a particular print job and the authentication information for utilizing the printing apparatus may be used to permit or prohibit the execution of a particular print job with a particular printing apparatus. Here, the print server 1 or the execution instructing terminal 3 may register the selected printing apparatus in association with the user of the execution instructing terminal 3. Specifically, for example, the execution control unit 14 may be provided with an interface of the execution instruction page so that the input of the user ID of the execution instructing terminal 3 allows the pre-registered printing apparatus to be selected. Further, the identification information of the selected printing apparatus may be registered to the execution instructing terminal 3 or may be registered to the print server 1. In the case where the identification information of the printing apparatus is registered to the print server 1 or the execution instructing terminal 3 so as to be selectable, it facilitates selection of the printing apparatus located at a remote place and causing the printing apparatus to execute the print job.

The print setting may be inputted only for items common to all the printing apparatuses associated with the representative mail address. Alternatively, the printing apparatus is selected prior to making the print setting, and then the print setting may be inputted for the items specific to the selected printing apparatus. For example, only the number of printing copies that are common to the print setting item of all the printing apparatuses may be inputted, or the print setting for duplex printing may be inputted when the selected printing apparatus supports it.

In response to an instruction on the execution of printing being given by the user, the execution instructing terminal 3 transmits the execution instruction to the print server 1 (S16). At this time, the execution instructing terminal 3 transmits to the print server 1 the authentication information, the selected printing apparatus, and the print setting along with the execution instruction.

Upon receiving the instruction on execution of printing, the print server 1 compares the received authentication information with the pre-stored authentication information to permit or prohibit the execution of the print job (S18). As already described, the instruction on execution of printing is made in association with the URL of the print instruction page, and the URL of the print instruction page is issued based on the character string that is the encrypted version of the job identification number of the print job. Therefore, the print server 1 that has received the instruction on execution of printing identifies the print job from the URL corresponding to the instruction on execution. Specifically, the execution control unit 14 decodes a predetermined part of the character string of the URL corresponding to the received execution instruction to acquire the job identification number and, after identifying the print job from the acquired job identification number, compares the received authentication information with the pre-stored authentication information to permit or prohibit the execution of the print job. When the authentication information is different for each print job, the print server 1 can pre-store the authentication information in association with the print job at the time of saving the print job. Also, when the authentication information is different for each registered user, the print server 1 can pre-store the authentication information in association with the print job at the time of saving the print job. Note that the print server 1 may set a saving period for the print job, and permit the execution of the print job when the instruction on execution of the print job is received within the saving period while prohibiting the execution of the print job when the instruction on execution of the print job is received after the saving period has elapsed.

Upon permitting the execution of the print job, the print server 1 generates the print data based on the print job (S19). In generating the print data, the execution control unit 14 may or may not implement color conversion, half-toning, interlace processing, and the like in accordance with the identified printing apparatus. Note that, when prohibiting the execution of the print job, the print server 1 may transmit a webpage for displaying an error message to the execution instructing terminal 3.

After generating the print data, the print server 1 communicates with the selected printing apparatus and transmits the generated print data to the selected printing apparatus 4 (S20). Communication between the print server 1 and the printing apparatus 4 is performed by using an address, an ID, a pass phrase, or the like that is pre-stored in the printing apparatus 4. After transmitting the print data, the print server 1 discards the corresponding print job.

Upon receiving the print data, the printing apparatus 4 executes printing based on the received print data (S21). In the case where an error occurs in executing printing, the printing apparatus 4 may notify the print server 1 of the error and the print server 1 that has been notified of the error may notify either at least one of the execution instructing terminal 3 and the job generating terminal 2 of the error. Further, when terminating printing, the printing apparatus 4 may notify the print server 1 of termination of printing, and the print server 1 that has been notified of the termination of printing may notify either at least one of the execution instructing terminal 3 and the job generating terminal 2 of the termination of printing. Further, the print server 1 may hold the print job until receiving the print termination notification and discard the print job after receiving the print termination notification.

According to the above-described embodiments, accessing the URL contained in the email results in printing of the held print job, so that the user is able to easily give a print instruction for the job and therefore good usability is achieved. Further, the URL for instructing the execution of the print job is transmitted by email, so that the relationship between the print job and the user receiving the print job address that is the access information for the print job is not fixed by the email address. For example, the user that has sent the print job to the print server may enable another user to instruct execution of the print job by forwarding, via email, the URL received by email. Further, for example, after the email application installed in the communication terminal receives the URL by the email from the print server, even when the email cannot be transmitted by the email application, the user is able to instruct execution of printing as long as the user can use the browser.

Further, the selection of the printing apparatus and the input of the print setting are accepted on the webpage that is for instructing execution of the print job, so that the printing apparatus for executing printing can be selected and the print setting can be inputted not at the timing of generating the print job but at the timing of instructing the execution of printing. Further, the GUI for selecting the printing apparatus and inputting the print setting can be provided on the webpage, which facilitates the user's selection of the printing apparatus.

The print job is acquired via a representative mail address corresponding to a plurality of printing apparatuses and therefore the representative mail address corresponds to a virtual printing apparatus for the user. The user is able to obtain a printed material at a desired time and a desired place by using such virtual printing apparatus.

4. Other Embodiments

It is noted that the technical scope of the invention is not limited to the above-described embodiments but various modifications may of course be added without departing from the scope of the invention.

For example, in selecting the printing apparatus, the execution instructing terminal may automatically select the printing apparatus. Specifically, for example, the execution instructing terminal may acquire the identification information of the printing apparatus from the printing apparatus located within a radio communication range of the execution instructing terminal and automatically select the printing apparatus the identification information of which has been acquired by the execution instructing terminal.

Further, the print start time may be set when the instruction on execution of the print job is given. For example, the print server may acquire the print start time from the execution instruction page and, at the timing when the acquired print start time is reached, transmit the print data to the printing apparatus to instruct execution of printing.

Further, for example, the print server may acquire the print job not by using email but by using webpage. Specifically, for example, the job generating terminal is caused to request the webpage for uploading the file of the print object. When the file of the print object is uploaded from the webpage transmitted upon request, the print server 1 can acquire the file of the print object as the print job. When the print job is acquired in this way, the print server is required to acquire, along with the print job, the address that is the destination of the email to which the URL for accessing the print job is transmitted. In this regard, for example, a text input box for inputting the email address can be provided for the webpage that is for uploading the file of the print object.

Further, for example, the print server may accept the instruction on execution of the print job through an operation on the print instruction page, or may accept the acquisition request itself of the print instruction page as the execution instruction.

The entire disclosure of Japanese Patent Application No. 2014-169133, filed Aug. 22, 2014 is expressly incorporated by reference herein.

What is claimed is:

1. A print server comprising:
 a processor that acquires a print job by receiving an email from a communication terminal at a representative mail address,
 the processor further holding the acquired print job, the processor further transmitting an email containing a URL for instructing execution of the held print job, the processor further, in response to receiving an access to the URL from a terminal, causing a printing apparatus to execute printing that is based on the print job corresponding to the URL, and the processor further associating the representative mail address with one or more printing apparatuses in advance, providing a webpage that prompts selection of one of the printing apparatuses based on the URL to the terminal, accepting the selection of one of the printing apparatuses associated with the representative mail address from the terminal, and causing the selected printing apparatus to execute printing that is based on the held print job.

2. The print server according to claim 1, wherein the processor transmits the email containing the URL to, as a destination, a sender address of the email received from the communication terminal.

3. The print server according to claim 1, wherein the processor associates the representative mail address with the printing apparatuses to store information of the printing apparatuses, accepts, in the URL or a second URL linked directly or indirectly to the URL, the selection of the one of the printing apparatuses associated with the representative mail address, and causes the selected printing apparatus to execute printing that is based on the held print job.

4. The print server according to claim 1, wherein the processor accepts an input of a print setting on the webpage corresponding to the URL or a second URL linked directly or indirectly to the URL and causes the selected printing apparatus to execute printing based on the input print setting.

5. The print server according to claim 1, wherein the processor accepts an input of authentication information on the webpage corresponding to the URL or a third URL linked directly or indirectly to the URL and permits or prohibits printing by the selected printing apparatus based on the input authentication information.

6. A printing system including a print server and a printing apparatus connected to the print server, wherein the print server comprises:

a processor that acquires a print job by receiving an email from a communication terminal at a representative mail address, the processor further holding the acquired print job, the processor further transmitting an email containing a URL for instructing execution of the held print job, the processor further, in response to receiving an access to the URL from a terminal, causing the printing apparatus to execute printing that is based on the print job corresponding to the URL, and the processor further associating the representative mail address with one or more printing apparatuses in advance, providing a webpage that prompts selection of one of the printing apparatuses based on the URL to the terminal, accepting the selection of one of the printing apparatuses associated with the representative mail address from the terminal, and causing the selected printing apparatus to execute printing that is based on the held print job.

7. A printing method for causing a printing apparatus to execute printing by control of a print server, the printing method comprising:

causing the print server to acquire a print job by receiving an email from a communication terminal at a representative mail address;

to hold the acquired print job;

to transmit an email containing a URL for instructing execution of the held print job; and to cause, in response to receiving an access of the URL from a terminal, the printing apparatus to execute printing that is based on the print job corresponding to the URL, the printing method further causing the print server to associate the representative mail address with one or more printing apparatuses in advance, to provide a webpage that prompts selection of one of the printing apparatuses based on the URL to the terminal, to accept the selection of one of the printing apparatuses associated with the representative mail address from the terminal, and to cause the selected printing apparatus to execute printing that is based on the held print job.

* * * * *